F. H. VAN HOUTEN, Jr.
MACHINE FOR ROUNDING UP LUMPS OF DOUGH IN THE MANUFACTURE OF BREAD.
APPLICATION FILED JUNE 18, 1909.
1,067,953.
Patented July 22, 1913.
2 SHEETS—SHEET 2.
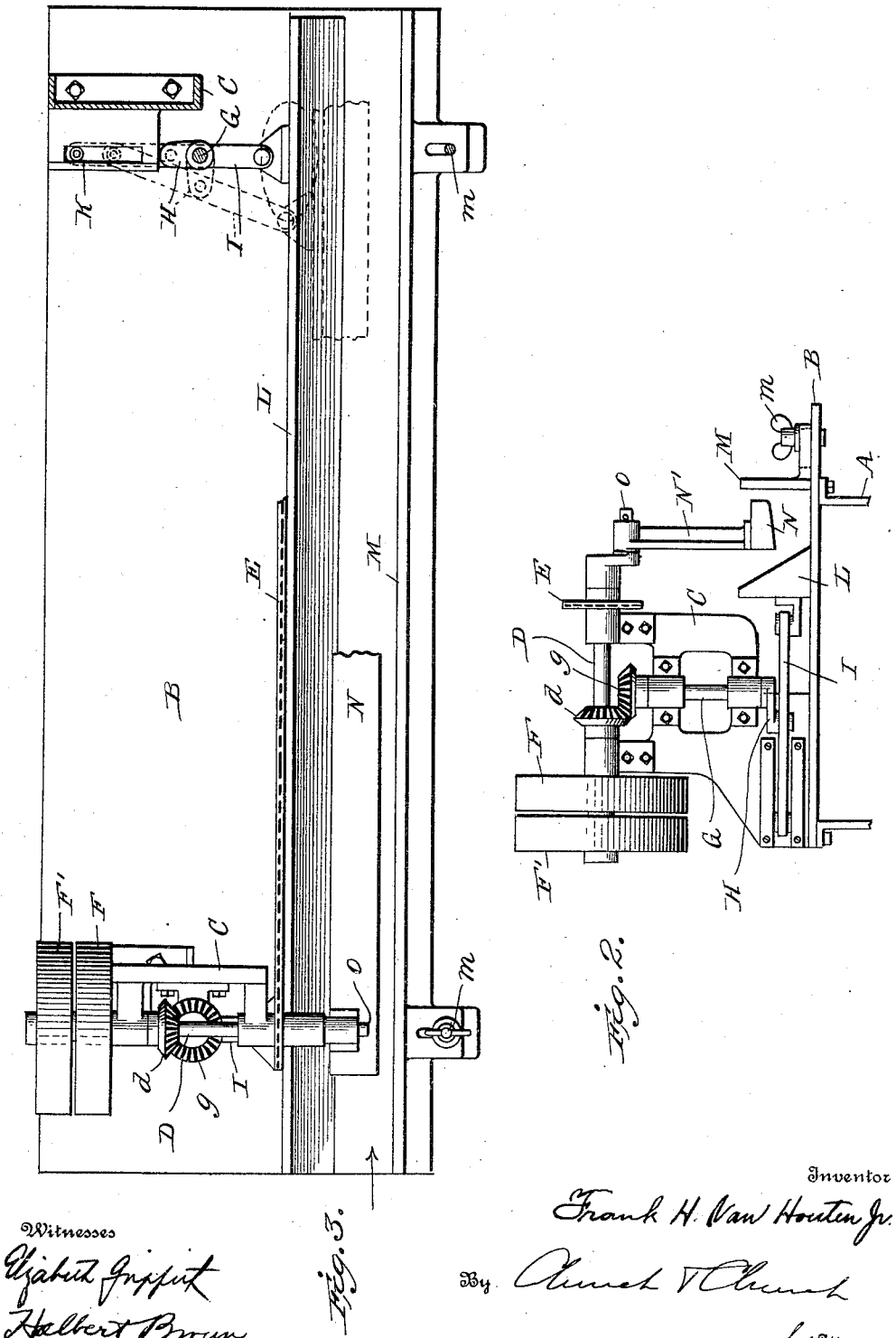

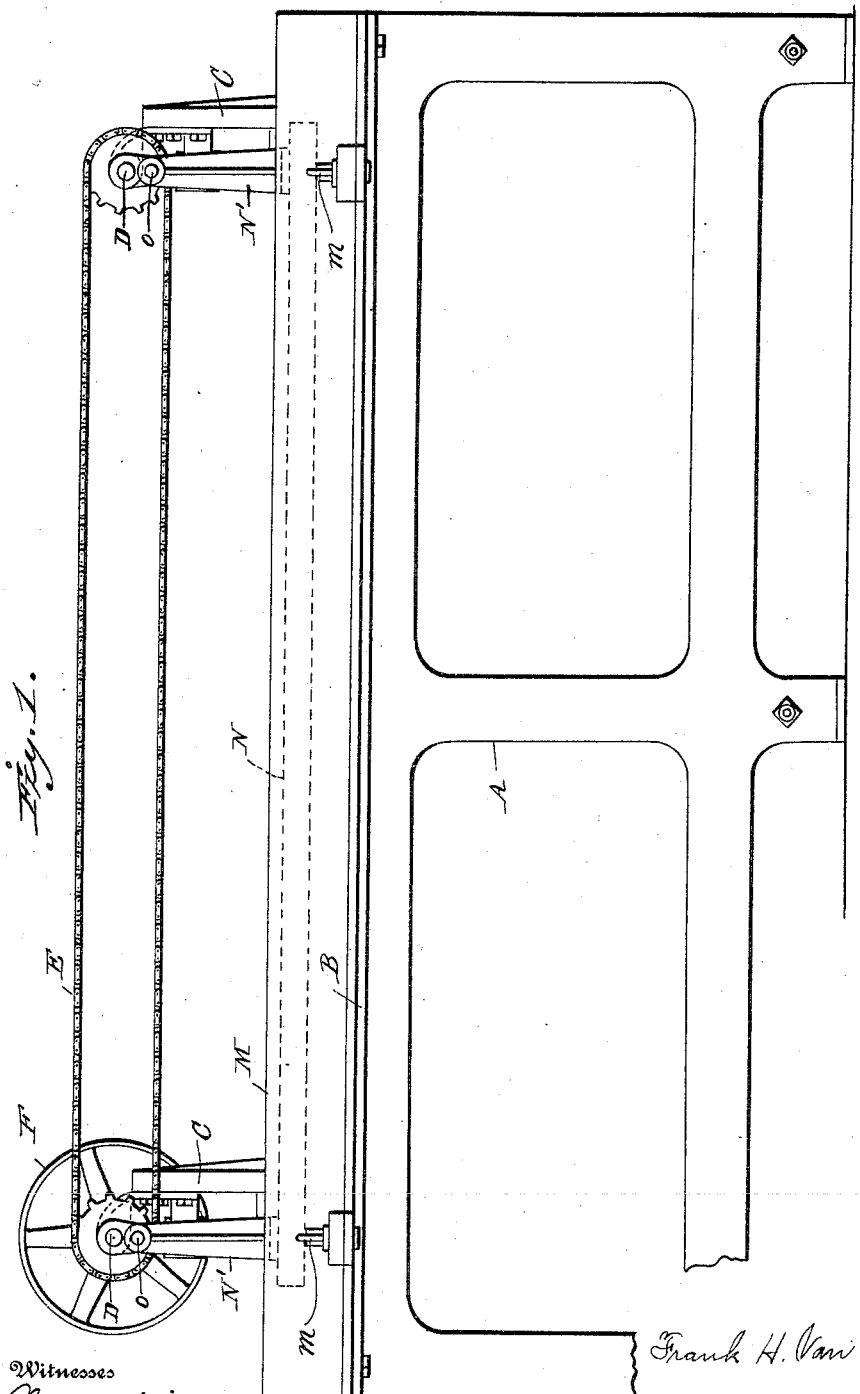

UNITED STATES PATENT OFFICE.

FRANK HENERY VAN HOUTEN, JR., OF FISHKILL-ON-THE-HUDSON, NEW YORK.

MACHINE FOR ROUNDING UP LUMPS OF DOUGH IN THE MANUFACTURE OF BREAD.

1,067,953. Specification of Letters Patent. Patented July 22, 1913.

Application filed June 18, 1909. Serial No. 502,972.

*To all whom it may concern:*

Be it known that I, FRANK H. VAN HOUTEN, Jr., a citizen of the United States, residing at Fishkill - on - the - Hudson, in the county of Dutchess and State of New York, have invented certain new and useful Improvements in Machines for Rounding Up Lumps of Dough in the Manufacture of Bread; and I do hereby declare the following to be a full, clear, and exact description of the same, reference being had to the accompanying drawings, forming a part of this specification, and to the figures and letters of reference marked thereon.

This invention relates to apparatus for rounding up, kneading and giving a surface finish to lumps of dough preparatory to the proofing and baking of the same to make bread.

The objects of the invention are to provide a machine which will effectually perform the kneading and rounding-up operations as a simultaneous and continuous process, whereby the lumps of dough may be treated in succession or a series of lumps simultaneously treated as they progress through the machine, one after the other.

In the accompanying drawings—Figure 1 is a front elevation of a machine embodying the present invention. Fig. 2 is an end elevation of the same, and Fig. 3 is a top plan view with the mechanism at one end of the table in section in order to illustrate more clearly the movement of the main molding board.

Like letters of reference in the several figures indicate the same parts.

The base frame A of the machine is illustrated as of conventional form and adapted to support a top board or table B upon which the mechanism of the present invention is mounted.

In proximity to opposite ends of the table, which latter may be of any desired length, say eight feet, more or less, are mounted vertically arranged frames C having at their upper ends bearings for horizontal shafts D, said shafts being geared together for simultaneous rotation in the same direction preferably by a sprocket chain and wheels E. On one of the shafts there is mounted a fast drive pulley F and a loose pulley F' whereby the shaft may be driven, as desired, through the manipulation of an ordinary drive belt. Each shaft carries a beveled gear $d$ meshing with a corresponding gear $g$ on a vertically arranged shaft G journaled in bearings projecting from the frame C and having at its lower end a crank arm H. The crank arms H have their crank pins journaled in levers I which levers, at one end, slide in transverse guideways or bearings K also carried by the frame C, and at their opposite ends are pivotally connected with a main molding board L. The molding board L extends approximately throughout the whole length of the table and moves over the surface of the same in a substantially elliptic path indicated at the right hand end of Fig. 3 by the dotted lines $l$, such movement being due to the crank and lever arrangement of the driving mechanism. As a result of the operation of this mechanism the molding board moves bodily forward and advances longitudinally of the table in a curved path, the maximum advance movement transversely of the length of the table being at a point substantially midway of the travel of the board longitudinally of the table.

The molding board L is preferably provided with an inclined face and arranged in opposition thereto is a longitudinal guide M, preferably adjustably mounted on the table by thumb nuts $m$, whereby it may be adjusted toward and from the molding board L, so as to accommodate lumps of dough of different size between the guide and molding board and permit the latter to move into and out of contact with the dough.

With the arrangement described, a lump of dough placed between the molding board and guide at one end of the machine will, due to the movements of the molding board, be caused to advance intermittently toward the opposite end of the table and, during each advance movement, the said lump of dough will be squeezed, partly or wholly raised from the table, and rolled between the molding board and guide. During the reverse movement of the molding board said lumps of dough will rest on the table close to the guide.

The described operation will impart to the lump of dough more or less of a surface finish and will, to a certain extent, knead the same, but in order to perform these operations in the most efficient manner and, in fact, to secure results which are as efficient as those obtained by the most skilful hand manipulation, a supplemental molding board is provided which will operate upon the lumps of dough in a reverse direction to the direction in which the molding board L operates upon the same. This, in effect, not only prolongs the surface over which, or in contact with which, the dough must travel, but performs an actual reverse kneading operation which imparts to the dough a uniform texture and a uniform surface finish throughout the whole lump.

The supplemental molding board is indicated in the accompanying drawing by the letter N and is adapted to operate in a vertical plane between the molding board and guide. A simple and convenient form of operating mechanism illustrated in the drawings, consists of crank arms O carried by the front ends of the shafts D, with which upwardly extending arms N' on the supplemental molding board connect. The crank arms O impart a bodily circular movement to the supplemental molding board and the direction of travel of said supplemental molding board when traversing the lower half of its path or when in contact with the dough is reverse or contrary to the direction of travel of the dough through the machine. The reverse movement imparted to the top portions of the lumps of dough by the supplemental molding board is, however, less than the advance movement imparted to the lumps of dough by the main molding board L and, consequently, the lumps of dough advance through the machine intermittently but in orderly sequence.

The main and supplemental molding boards operate upon the lumps of dough alternately, one making its effective movement while the other is making its return or ineffective movement, and the two together operating to thoroughly knead the dough and to uniformly stretch and give the surface a proper tension and finish.

Obviously, the lumps of dough may be supplied to the machine and removed therefrom by any suitable appliances or, if desired, by hand labor and in this connection it will be noted that the supplemental molding board does not extend to the entering end of the machine, thus leaving a space for the reception of the lumps of dough.

Having thus described my invention, what I claim as new, and desire to secure by Letters Patent, is—

1. In a rounding-up machine for lumps of dough, the combination with the table, guide arranged above said table, molding board arranged in opposition to said guide but removed therefrom whereby lumps of dough may be placed on the table between the guide and board, and operating means whereby the lumps of dough are kneaded and caused to advance intermittently, of a supplemental molding board, and means for moving said supplemental molding board into contact with the dough and in a direction reverse to the direction of travel of the dough through the machine.

2. In a rounding-up machine for lumps of dough, the combination with the table, guide, molding board, and operating means whereby the lumps of dough are kneaded and caused to advance intermittently between the guide and molding board, of an intermittently operating supplemental molding board working between the guide and main molding board, and means for operating said supplemental molding board, to move it into engagement with the dough during the interval between the advance movements of the dough.

3. In a rounding-up machine for lumps of dough, the combination with the table and guide extending above said table, of the main and supplemental molding boards, and operating mechanism for alternately advancing said main and supplemental molding boards into position to operate upon the lumps of dough and for alternately withdrawing them from their advanced positions.

4. In a rounding-up machine for lumps of dough, the combination with the table, upwardly extending guide above said table, and main and supplemental molding boards movable in planes at substantially right angles to each other, of crank arms and gearing connecting said crank arms whereby the main and supplemental molding boards will be alternately advanced into position to operate upon the lumps of dough.

5. In a rounding-up machine for lumps of dough, the combination with the table, the upwardly projecting guide above said table, the horizontally movable main molding board and the vertically movable supplemental molding board, of operating shafts having crank arms on which the supplemental molding board is hung, and operating mechanism for the main molding board driven from said shafts, whereby the main and supplemental molding boards will be alternately advanced into position to operate upon the lumps of dough.

6. In a rounding-up machine for lumps of dough, the combination with the table, upwardly extending guides above said table and main and supplemental molding boards, of oppositely rotating crank arms connected with said main and supplemental molding boards, respectively, and intermediate gears between said crank arms whereby the main and supplemental molding boards are alternately advanced into position to operate upon the lumps of dough and are caused to act thereon in opposite directions with respect to the path of travel of the dough through the machine.

FRANK HENERY VAN HOUTEN, Jr.

Witnesses:
HOWARD B. WILTSE,
F. H. VAN HOUTEN, Sr.

Copies of this patent may be obtained for five cents each, by addressing the "Commissioner of Patents, Washington, D. C."